United States Patent
Nielsen

(10) Patent No.: US 7,500,819 B2
(45) Date of Patent: Mar. 10, 2009

(54) STACK-FORMING ARRANGEMENT

(75) Inventor: Erik Vind Nielsen, Esbjerg (DK)

(73) Assignee: Müller Martini Holding AG, Hergiswil (CH)

( * ) Notice: Subject to any disclaimer, the term of this patent is extended or adjusted under 35 U.S.C. 154(b) by 0 days.

(21) Appl. No.: 10/873,763

(22) Filed: Jun. 23, 2004

(65) Prior Publication Data

US 2004/0265114 A1 Dec. 30, 2004

(30) Foreign Application Priority Data

Jun. 23, 2003 (EP) ................................. 03405454

(51) Int. Cl.
   *B65G 57/00* (2006.01)
   *B65G 23/44* (2006.01)
   *B65G 29/00* (2006.01)

(52) U.S. Cl. .................... 414/790; 198/468.8; 198/813; 414/795.2; 414/790.7

(58) Field of Classification Search ................ 414/790, 414/794.9, 795.2–795.5; 198/468.8, 468.2, 198/811, 813, 468.1, 809, 812, 823, 837, 198/806, 804, 485.1, 819; 271/159
   See application file for complete search history.

(56) References Cited

U.S. PATENT DOCUMENTS 2,857,058 A * 10/1958 Campbell ................ 414/788.9
3,035,176 A * 5/1962 Lamb et al. ............... 414/788.9
3,904,045 A * 9/1975 Thibault ................... 414/788.9
4,041,785 A * 8/1977 Roark ........................... 74/11
5,727,925 A   3/1998 Ozawa et al.
5,896,978 A * 4/1999 Spatafora ................. 198/468.8
2002/0121424 A1* 9/2002 Miyake .................... 198/468.8

FOREIGN PATENT DOCUMENTS

| DE | 27 40 423 A1 | 3/1979 |
| DE | 31 00 003 A1 | 3/1982 |
| EP | 0 784 027 A1 | 7/1997 |

OTHER PUBLICATIONS

ASV, Darmstadt, Axel Springer Publishing House in Darmstadt, May 28, 2002.

* cited by examiner

*Primary Examiner*—Gregory W Adams
(74) *Attorney, Agent, or Firm*—Venable LLP; Robert Kingberg; Steven J. Schwarz

(57) ABSTRACT

An arrangement for an optional forming of stacks of multiple products conveyed successively along a conveying path, and/or for changing the sequence of products conveyed successively along the conveying path. The arrangement includes a conveying device having conveying sections for transporting the products in a conveying direction. At least one up and down movable lifting element is disposed on at least one side of the conveying device and picks up the products from an underside of the products along the conveying path from the conveying device and subsequently deposits them again. The lifting element is disposed at a right angle to the conveying direction and is displaceable below a support surface of the conveying device.

6 Claims, 3 Drawing Sheets

STACK-FORMING ARRANGEMENT

CROSS-REFERENCE TO RELATED APPLICATION

This application claims the priority of European Patent Application No. 03405454.4, filed on Jun. 23, 2003, the subject matter of which is incorporated herein by reference.

BACKGROUND OF THE INVENTION

The invention relates to an arrangement for the optional forming of stacks from several products, conveyed successively along a conveying path, and/or for changing the sequence of products, conveyed successively along a conveying path, the arrangement comprising a conveying device for conveying the products and at least one lifting apparatus for picking up the products along the conveying path from the conveying device and subsequently depositing them, wherein the lifting apparatus is designed as an up and down moving lifting element which picks up the products from the underside.

An arrangement of the aforementioned type has been in use at the Axel Springer Publishing House in Darmstadt, Germany, for processing stacked printed products.

The aforementioned arrangement consists of a narrow conveying belt, extending across a table, on which stacks are formed from bundled magazines. For this, a separate, height-adjustable fork is provided on both sides of the conveying belt and this fork is inserted underneath the magazine bundles, which project on both sides over the conveying belt that is stopped during the stacking operation, and lifts up these bundles. Thus, the lifted-up magazine bundle can then be lowered onto the subsequently arriving bundle during the following conveying step. The forks, which are arranged opposite each other on both sides of the conveying belt, are lifted up jointly by means of a synchronously driven toothed belt.

SUMMARY OF THE INVENTION

It is an object of the present invention to create a simple arrangement that allows the forming of a stack consisting of several products during a shorter cycle time.

The above and other objects are achieved according to the invention by the provision of an arrangement for an optional forming of stacks of multiple products conveyed successively along a conveying path, and/or for changing the sequence of products conveyed successively along the conveying path, the arrangement comprising: a conveying device having conveying sections for transporting the products in a conveying direction; and at least one up and down movable lifting element disposed on at least one side of the conveying device and which picks up the products from an underside of the products along the conveying path from the conveying device and subsequently deposits them again, the lifting element being disposed at a right angle to the conveying direction and being displaceable below a support surface of the conveying device.

To be able to grip products with differently large deposit surfaces from the underside, the lifting element is provided with several support rods that project evenly spaced and at right angles to the conveying direction from a support.

It is advantageous if two separately controlled and/or driven lifting elements are arranged on opposite sides of the conveying device, which make it possible to achieve a higher output.

The conveying device preferably is a working section of a circulating conveying belt, the support surface of which is interrupted several times in the operative range of the lifting element, so that the support rods can be inserted.

A simple measure for creating interruptions in the support surface is to have conveying belt sections that are deflected below the support surface and back.

The deflected sections of the conveying belt are advantageously formed by rolls that can be jointly lowered, thus creating a downward extending loop into which the support rods of the lifting element are inserted, such that they are positioned below the level of the support surface of the conveying section.

If the arrangement is not in use, the rolls that form the interruptions in the support surface can be lifted out jointly, thus resulting in a continuous conveying section of the conveying device.

A tensioning device, connected to the conveying belt, can function as simple means for removing the interruptions in the support surface through re-tensioning of the conveying belt once the rolls are lifted out.

Alternatively, the support surface of the conveying device can be formed by driven conveying rolls, arranged transverse to the conveying direction, wherein individual conveying rolls can be lowered to form interruptions in the support surface.

To secure the products during the stacking, a format-adjustable vertical guide is provided above and/or at the upper end of the lifting element, into which the products, lifted up from below for the stacking operation, are inserted.

It is advantageous if one position for gripping the products is arranged below the vertical guide on the support surface, such that the products can be lifted up perpendicular.

BRIEF DESCRIPTION OF THE DRAWINGS

The invention is explained with the aid of an exemplary embodiment and with reference to the drawing, to which reference is made for all details not further mentioned in the description.

DETAILED DESCRIPTION OF THE INVENTION

Figure 1:
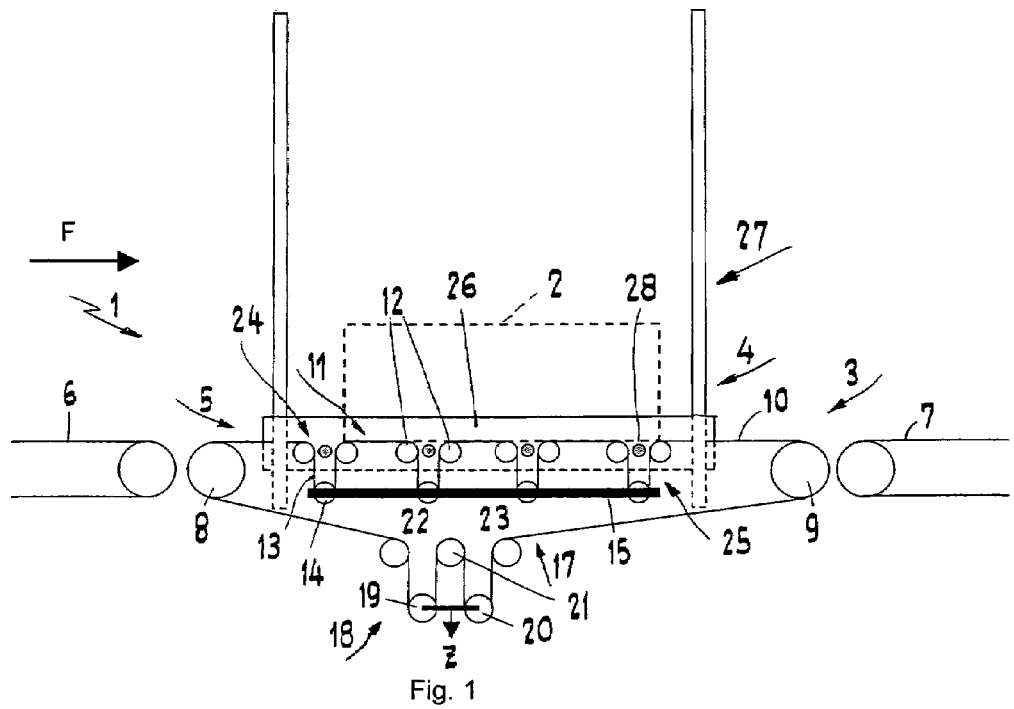
FIG. 1 is a schematic view from the side of the device according to the invention.

FIG. 1 shows an arrangement 1 for forming predetermined stacks from several products 2, which can be stacked one above the other and are conveyed successively in the direction or arrow F. This arrangement can also be used for changing the sequence in which the products 2 are conveyed successively along a conveying path. The products can be stackable goods, such as bundles, individual magazines, brochures, books, work pieces or the like. The products 2 are conveyed with the aid of a conveying device 3, and are lifted up at a location along the conveying path where a stacking device 4 is positioned. Several arrangements 1 can also be arranged along the conveying path, wherein products 2 can be transported and lifted up either continuously or discontinuously.

For the purpose of lifting products 2 off conveying device 3, the latter is provided with a conveying element 5 which forms a conveying section of the conveying path. This conveying element 5 is at least as long as the longest products to be stacked. At least one conveying section 6 for feeding products 2 is installed upstream of conveying element 5 while a conveying section 7 or a different processing station can be installed downstream of this element.

Figure 2:
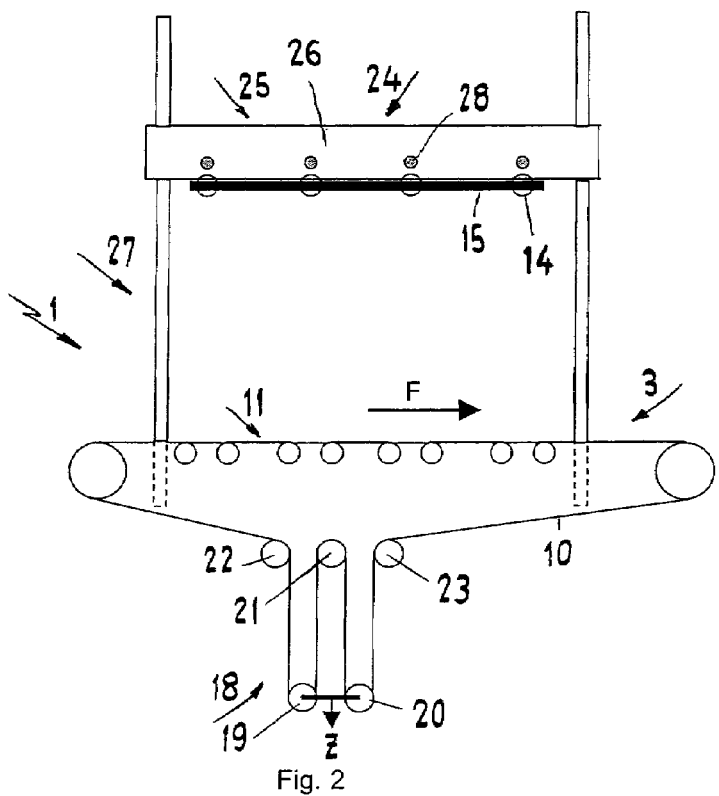
FIG. 2 is a schematic view from the side of the device according to FIG. 1, with raised mechanisms and raised intake rolls.

Conveying element 5 is an endless conveying belt 10 that circulates around two spaced-apart deflection rolls 8, 9 and forms a support surface 11 by means of a conveying belt section for products 2 to be transported. Support surface 11 is interrupted by respective roll pairs 12, around which conveying belt 10 is deflected so as to form a downward loop 13. Of these roll pairs 12, at least two pairs are arranged (evenly) distributed over the length of the effective product pickup area, wherein FIG. 1 shows four roll pairs 12 of this type. Each belt loop 13 is respectively created through one intake roll 14 which pulls conveying belt 10 via a roll pair 12 from a stretched position (see FIG. 2) downward. The four intake rolls 14, used for the exemplary embodiment shown in FIGS. 1 and 2, are respectively positioned with each end in a respective joint roll support 15, 16 that is arranged to the side of the conveying element 5 (see also FIGS. 3 and 4).

Conveying belt 10 is tensioned with a tensioning device 18 which acts upon an empty belt section 17. For this, the conveying belt 10 moves around two tensioning rolls 19, 20, arranged in the manner of pulleys, and a deflection roll 21 after and/or before conveying belt 10 has been deflected around deflection rolls 22, 23 in a vertical direction. Conveying belt 10 is respectively pre-tensioned with a tensioning force Z at rolls 19, 20.

Roll supports 15, 16 are held by a holding device, not shown herein, below the level of supporting surface 11, so that a lifting element 24 of a lifting apparatus 25 can be inserted below the support surface 11 into belt loops 13.

The lifting apparatus 25 furthermore comprises a support 26, guided on a frame 27, such that it can be adjusted in a perpendicular direction and can be secured. Support rods 28 are attached on one end to support 26 such that they project in the manner of an extension arm from a side into an area of operation of lifting apparatus 25. FIG. 1 shows a lifting element 24, consisting of four support rods 28, which make it possible to pick up products 2 or packages even considerably shorter than the fork-type lifting element.

FIG. 2 shows arrangement 1 in the form of a simple conveying device 3, with a continuous support surface 11, wherein lifting apparatus 25, and lifted-out intake rolls 14 are in a non-operational position above conveying surface 11. To achieve the non-operational position, lifting apparatus 25 including support 26 and lifting element 24, and roll supports 15, 16 are connected to a motor-driven (not visible herein) lifting mechanism that places lifting apparatus 25 and roll supports 15, 16 into the position shown in FIGS. 1 and 2. Once intake rolls 14 are moved out of belt loops 13, conveying belt 10 is re-tensioned with tensioning device 18 to form a continuous, level support surface 11 above the roll pairs 12.

As a result, the arrangement 1 is partially turned off and can be operated simply as a conveying element for conveying device 3.

Of course, it is also possible to install several arrangements 1 along a conveying device 3.

Figure 3:
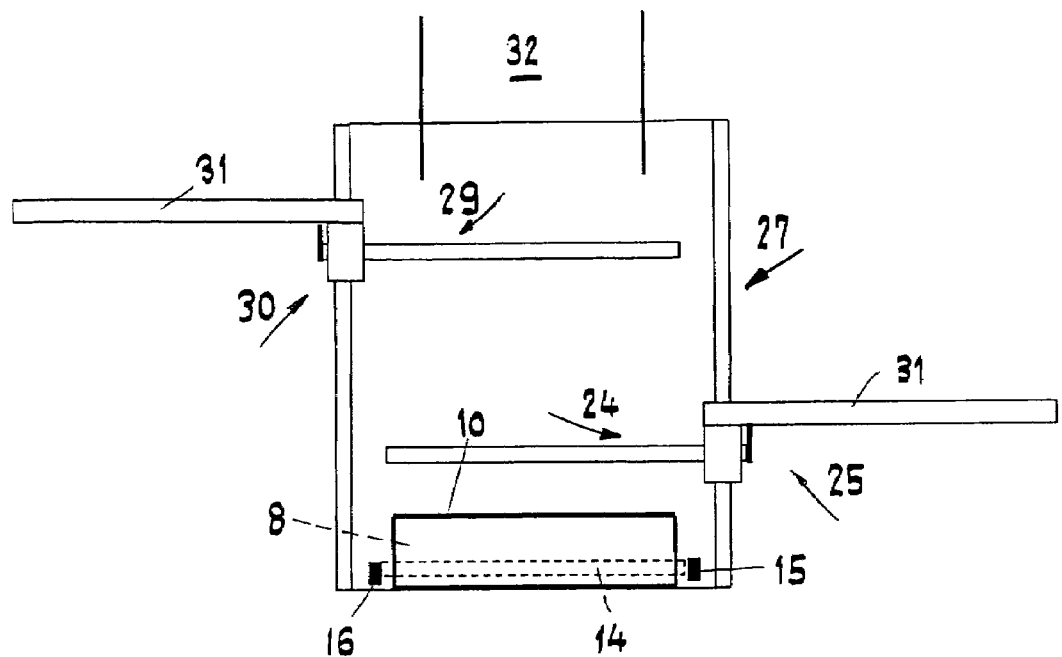
FIG. 3 is a view of the arrangement in transporting direction F in FIG. 1, with the lifting elements inserted into the conveying path.
Figure 4:
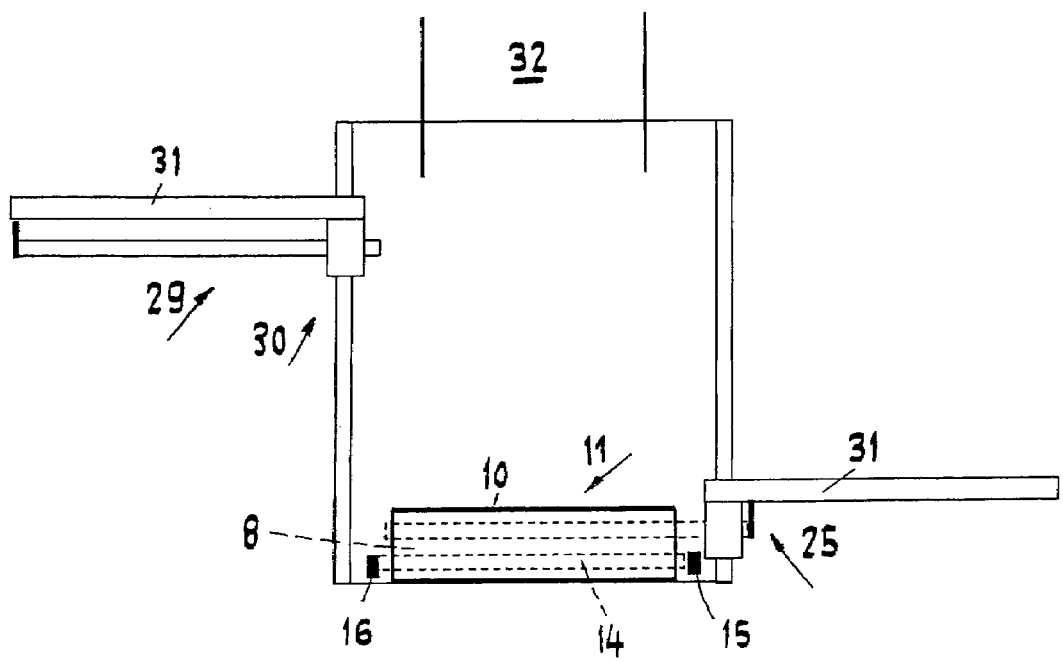
FIG. 4 is a view of the arrangement according to FIG. 3, with extended lifting elements.

FIGS. 3 and 4 show arrangement 1 as seen in transporting direction F wherein intake rolls 14 that form belt loops 13 are located below support surface 11 of conveying belt 10, meaning the support surface 11 has gaps into which support rods 28 of lifting element 24 of lifting apparatus 25 can be inserted.

FIGS. 3 and 4 illustrate an arrangement 1 with two driven lifting elements 24, 29 of respective lifting apparatus 25, 30, wherein these lifting elements are positioned opposite each other on both sides of conveying device 3 and/or conveying element 5 and can be driven to move up and down on frame 27. Each lifting apparatus 25, 30 can thus be driven along frame 27 independent of the other one. Support rods 28 of lifting elements 24, 29 respectively can be displaced jointly in the manner of a telescope from an operating position, where they are located above conveying element 5, to a non-operating position on the side of the conveying element. Respectively one pneumatic cylinder 31 associated with each lifting apparatus 25, 29 is provided for this, as indicated. Naturally, a mechanical device could be provided for the same purpose. As for the height adjustment of a lifting apparatus 25, 30, there may be provided a lifting mechanism, in the form of a toothed belt (not shown) that runs around a lower or an upper roll (not shown) and which is attached at both ends to support 26 of lifting elements 24, 29. The height-adjustable lifting element 24, 29 is respectively guided along two vertical posts 27 that project through support 26.

A vertical guide 32 is arranged above the support surface 11, at the maximum height for the up and down moving lifting elements 24, 29, on which one or several products 2 can be positioned one above the other for maintaining their position during the stack forming. The vertical guide 32 is designed such that it can adjust to the corresponding products 2 to be stacked.

Figure 5A:
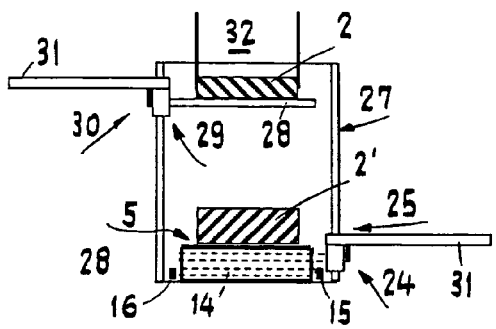
FIGS. 5A-5F show a stacking operation of the arrangement, in a step-by-step representation.

The mode of operation for arrangement 1 for stacking products is explained in the following with the aid of FIGS. 5A to 5F. In FIG. 5A, a stack of products 2 has been lifted off support surface 11 with the aid of lifting element 29 of lifting apparatus 30 and has been positioned in vertical guide 32. In the meantime, a following product 2' on conveying element 5 is available for pickup by lifting element 24 of lifting apparatus 25 that is inserted into the gaps formed by belt loops 13 in support surface 11 or is in the process of passing by stacking device 4.

Figure 5B:
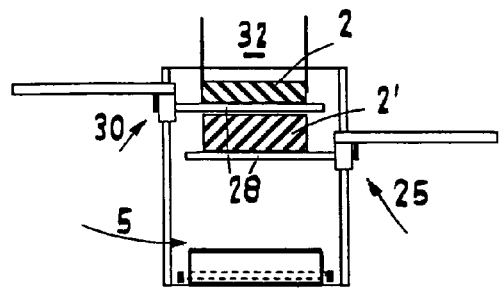
Figure 5C:
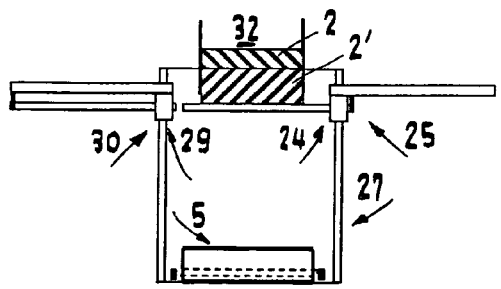

According to FIG. 5B, product 2' is lifted up with lifting apparatus 25 from the conveying element 5 and is raised to below the lifting element 29 and/or its support rods 28. Product 2' preferably does not make contact with the underside of support rods 28, so that it will not be displaced in the compound stack on support rods 28 of lifting element 25 when support rods 28 of lifting element 29 are pulled out.

In the following step (FIG. 5C), lifting element 29 underneath product 2 is pulled out to the side, so that the latter, which is secured on the side of vertical guide 32, comes to rest on top of the product 2' underneath. Immediately following this, both products 2 and 2' are lifted up further, until lower product 2' has reached the vertical guide 32.

Figure 5D:
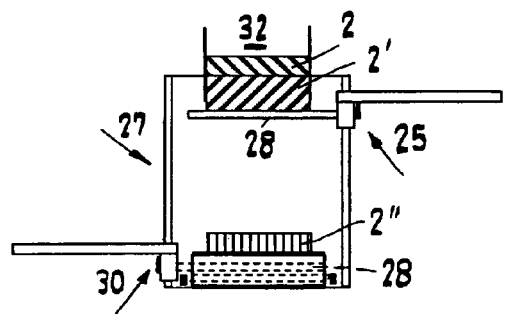
Figure 5E:
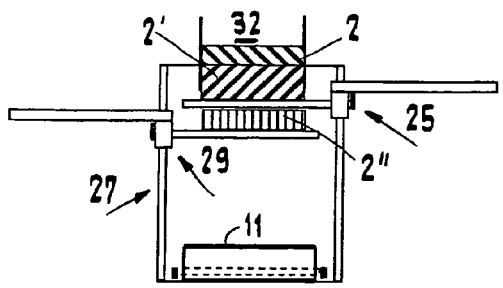

According to FIG. 5D, a product 2" subsequently reaches the position where it is picked up by the stack-forming device 4, below vertical guide 32 on conveying element 5, where it is awaited by lifting element 29 of lifting apparatus 30 that has meanwhile been lowered below the support surface 11. This third product 2" is then lifted up to below the packet consisting of the upper product 2 and lower product 2', in the same way as the product 2' (see FIG. 5E).

Following this, lifting element 24 is again removed again from the stack, so that three stacked products 2, 2' and 2" rest on the support rods 28 of lifting element 29.

Figure 5F:
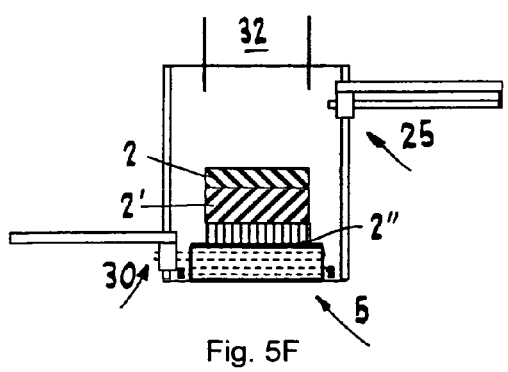

The finished packet and/or the stack consisting of three products 2, 2' and 2" is then lowered with lifting apparatus 30 onto support surface 11 of conveying element 5 and is thus transported further along conveying device 3 (FIG. 5F).

The forming into stacks is carried out with a control (not shown herein), which is connected to a programmable computer. With the aid of a processing program in the computer, the device 1 can automatically form product stacks from the supplied products 2, 2', 2". The arrival of the supplied products 2, 2', 2" is determined, for example, with sensors installed in front of device 1, so that a fully automatic stack-forming operation is created. Products 2, 2', 2" to be stacked are determined with the aid of the computer program, meaning individual products 2 can also pass through the device 1 without being stacked.

The product stacks or individual products can then be packaged or hoop-encased downstream of device 1 and can subsequently be addressed and/or delivered to a palletizer for shipping.

For a precise positioning of the products in the device 1, an end stop (not shown herein) which can be raised to above the support surface 11, can also be used on the transport path upstream of the device 1.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An arrangement for an optional forming of stacks of multiple products conveyed successively along a conveying path, or for changing a sequence of products conveyed successively along the conveying path, said arrangement comprising:

a conveying device comprising a circulating conveying belt having conveying sections for transporting the products in a conveying direction, the conveying belt defining a support surface;

at least two lifting elements disposed opposite from one another, with one of the lifting elements located on each respective side of the conveying device, the at least two lifting elements adapted to move up and down independently from one another, and to pick up the products from an underside of the products along the conveying path from the conveying device and subsequently stack the products, each lifting element comprising a plurality of support rods spaced apart from one another and projecting at right angles to the conveying direction to form a support for the products, each lifting element being displaceable from below the support surface of the conveying belt to above the support surface of the conveying belt; and rollers that span the entire width of the support surface, wherein the rollers have a first position above the support surface in which objects are lifted, and a second, belt deflecting position below the support surface in which the deflection creates gaps in said conveying belt into which the lifting elements enter;

wherein each of the at least two lifting elements is movable within a respective one of the gaps in the support surface to a position below the support surface, thereby interrupting substantially the entire width of the support surface.

2. The arrangement according to claim 1, further comprising a tensioning device to re-tension the conveying belt to remove gaps in the support surface.

3. The arrangement according to claim 1, further comprising driven conveying rolls to form the surface of the conveying belt.

4. The arrangement according to claim 1, wherein the upper end of the lifting apparatus comprises a format-adjustable vertical guide.

5. The arrangement according to claim 4, wherein a position for picking up the products from the support surface is arranged below the vertical guide.

6. The arrangement according to claim 1, wherein the rollers are attached to a joint roll support.

* * * * *